United States Patent
Hoshino et al.

(10) Patent No.: US 10,151,332 B2
(45) Date of Patent: Dec. 11, 2018

(54) HYBRID WORK MACHINE

(71) Applicant: Hitachi Construction Machinery Co., Ltd., Tokyo (JP)

(72) Inventors: Masatoshi Hoshino, Tsuchiura (JP); Shinji Ishihara, Hitachinaka (JP); Shiro Yamaoka, Hitachi (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 366 days.

(21) Appl. No.: 14/770,624

(22) PCT Filed: Jun. 24, 2014

(86) PCT No.: PCT/JP2014/066741
§ 371 (c)(1),
(2) Date: Aug. 26, 2015

(87) PCT Pub. No.: WO2014/208568
PCT Pub. Date: Dec. 31, 2014

(65) Prior Publication Data
US 2016/0097405 A1     Apr. 7, 2016

(30) Foreign Application Priority Data

Jun. 26, 2013   (JP) ................. 2013-134307

(51) Int. Cl.
*F15B 15/08*   (2006.01)
*B60W 10/08*   (2006.01)
(Continued)

(52) U.S. Cl.
CPC ........... *F15B 15/088* (2013.01); *B60K 6/485* (2013.01); *B60W 10/08* (2013.01); *B60W 20/00* (2013.01);
(Continued)

(58) Field of Classification Search
CPC ...... B60K 6/485; B60W 20/00; E02F 9/2246; F02D 29/04
(Continued)

(56) References Cited

U.S. PATENT DOCUMENTS

| | | | |
|---|---|---|---|
| 7,086,226 B2* | 8/2006 | Oguri | E02F 9/2075 60/414 |
| 2002/0125052 A1* | 9/2002 | Naruse | B60K 6/12 180/53.8 |

(Continued)

FOREIGN PATENT DOCUMENTS

| | | |
|---|---|---|
| JP | 2004-011256 | 1/2004 |
| JP | 2011-220068 | 11/2011 |

(Continued)

OTHER PUBLICATIONS

Extended European Search Report issued in counterpart European Application No. 14816887.5 dated Jan. 12, 2017 (seven (7) pages).
(Continued)

*Primary Examiner* — Sean Gugger
(74) *Attorney, Agent, or Firm* — Crowell & Moring LLP

(57) ABSTRACT

A hybrid work machine includes: an engine controller (14) that controls rotational speed of an engine (7) in accordance with a target rotational speed input from an EC dial (31); an assist motor (10) that generates electricity using power of the engine (7); a hydraulic pump (6) operated using power of the engine and/or of the assist motor; and a vehicle body controller (11) that estimates power (Pe) the engine is required to output when a request to generate electricity is sent to the assist motor and permits the assist motor to generate electricity only when the engine power requirement is not greater than an electricity generation threshold value
(Continued)

($E_{th1}$). The electricity generation threshold value ($E_{th1}$) is determined based on the power and characteristics of energy loss of the engine (7).

5 Claims, 9 Drawing Sheets

(51) Int. Cl.
*B60W 20/00* (2016.01)
*E02F 9/20* (2006.01)
*E02F 9/22* (2006.01)
*B60K 6/485* (2007.10)
*F15B 11/08* (2006.01)
*F02D 29/04* (2006.01)

(52) U.S. Cl.
CPC .......... *E02F 9/2075* (2013.01); *E02F 9/2246* (2013.01); *E02F 9/2296* (2013.01); *F02D 29/04* (2013.01); *F15B 11/08* (2013.01); *B60W 2510/0666* (2013.01); *F15B 2211/20515* (2013.01); *F15B 2211/20523* (2013.01); *Y02T 10/6226* (2013.01)

(58) Field of Classification Search
USPC ...................................................... 290/40 C
See application file for complete search history.

(56) References Cited

U.S. PATENT DOCUMENTS

| | | | | |
|---|---|---|---|---|
| 2007/0193262 A1* | 8/2007 | Iwamoto | ............... | B60W 10/06 60/421 |
| 2011/0098873 A1* | 4/2011 | Koga | ....................... | B60K 6/48 701/22 |
| 2012/0310461 A1* | 12/2012 | Maruyama | ............. | B60K 6/445 701/22 |
| 2013/0190960 A1* | 7/2013 | Kawashima | .......... | B60W 10/06 701/22 |
| 2016/0289923 A1* | 10/2016 | Ishihara | ................ | E02F 9/2296 |
| 2017/0274755 A1* | 9/2017 | Yoshida | ................ | B60K 6/485 |

FOREIGN PATENT DOCUMENTS

| | | |
|---|---|---|
| WO | WO 2008/041892 A1 | 4/2008 |
| WO | 2012/046788 A1 | 4/2012 |

OTHER PUBLICATIONS

Notification of Transmittal of Translation of the International Preliminary Report on Patentability (Chapter I or Chapter II), in International Application No. PCT/JP2014/066741, dated Jan. 7, 2016.

* cited by examiner

HYBRID WORK MACHINE

TECHNICAL FIELD

The present invention relates to a hybrid work machine that allows an engine and an electric motor to serve as the power sources of a hydraulic pump.

BACKGROUND ART

Some of hybrid hydraulic excavators, an example of hybrid work machines, operate as follows. During work with a heavy load, such as at excavating, the excavators use both an engine and an electric motor (an assist motor) to drive a hydraulic pump, the electric motor being driven by discharge of a secondary battery and thus assisting the engine. During deceleration of an upper swing structure or boom lowering, the excavators utilize the mechanical energy coming from this operation to allow a generator motor to generate electricity. Such electric energy is subsequently charged in the secondary battery.

The charge and discharge of the secondary battery are repeated as described above during the hybrid hydraulic excavators operating. The energy from the recovered mechanical energy as above alone, however, does not easily cover all the energy discharged by the assist motor during the operation of the excavators. The state of charge (SOC) of the battery consequently decreases as the operating time passes, which can make the excavators highly likely to fail to carry out operation with a heavy load Extra power that an engine can have during no operation or operation with a relatively light load is usually used to generate electricity with the use of a generator, such as an assist motor, to maintain the SOC of the secondary battery. This electric energy is then used to charge the secondary battery. The charge through the recovery of the mechanical energy utilizes particular motions of the operation, and so the timing of the charge cannot be selected. Yet the battery still can be charged through the electricity generation of the assist motor with the engine whenever the engine has sufficient extra power.

In this regard, JP-2011-220068-A proposes the following method. During operation, a secondary battery is quickly charged through electricity generation of an assist motor as much as possible to prevent lower battery SOC and thus maintain operability. During standby, i.e., during no operation, the amount of charge is reduced to decrease damage to the battery. Shorter lifetime of the battery is prevented accordingly.

PRIOR ART DOCUMENT

Patent Document

Patent document 1: JP-2011-220068-A

SUMMARY OF THE INVENTION

Problem to be Solved by the Invention

An original purpose of adopting a hybrid system to work machines is to improve fuel consumption. JP-2011-220068-A, however, does not refer to the relation between fuel consumption and timings of charge.

In focusing on the charge of a secondary battery, timings of charge through the electricity generation of the assist motor can be limited by some operation patterns. However, such timings are not determined uniquely. Any timing from the time when the engine has sufficient extra power as described earlier can be selected. With the relation between the timing and fuel consumption taken into account, it is important to charge the battery through electricity generation while selecting the time of low fuel consumption from the time when the engine has sufficient extra power.

It is an object of the present invention to provide a hybrid work machine that reduces extra fuel consumption when a secondary battery is charged and that allows for charge with high fuel efficiency.

Means for Solving the Problem

To achieve the above object, the present invention includes: an engine; a motor generator for generating electricity by using power of the engine (the engine power); a hydraulic pump operated by using the power of the engine and/or the motor generator; and a controller configure to estimate power (engine power requirement) the engine is required to output when a request to generate electricity is sent to the motor generator and permit the motor generator to generate electricity only when the engine power requirement is equal to or less than a preset threshold value. The electricity is consequently generated by the motor generator only in a lower power zone in which an energy loss is relatively small. The electricity generation of the motor generator is not allowed in a high power zone in which the energy loss is relatively large. The fuel consumption of the engine when the electricity storage device is being charged is reduced, thus improving the fuel consumption of the hybrid hydraulic excavator.

Advantageous Effect of the Invention

The present invention allows for charge with high fuel efficiency.

MODE FOR CARRYING OUT THE INVENTION

Embodiments of the present invention will now be described with reference to the drawings.

Figure 1:
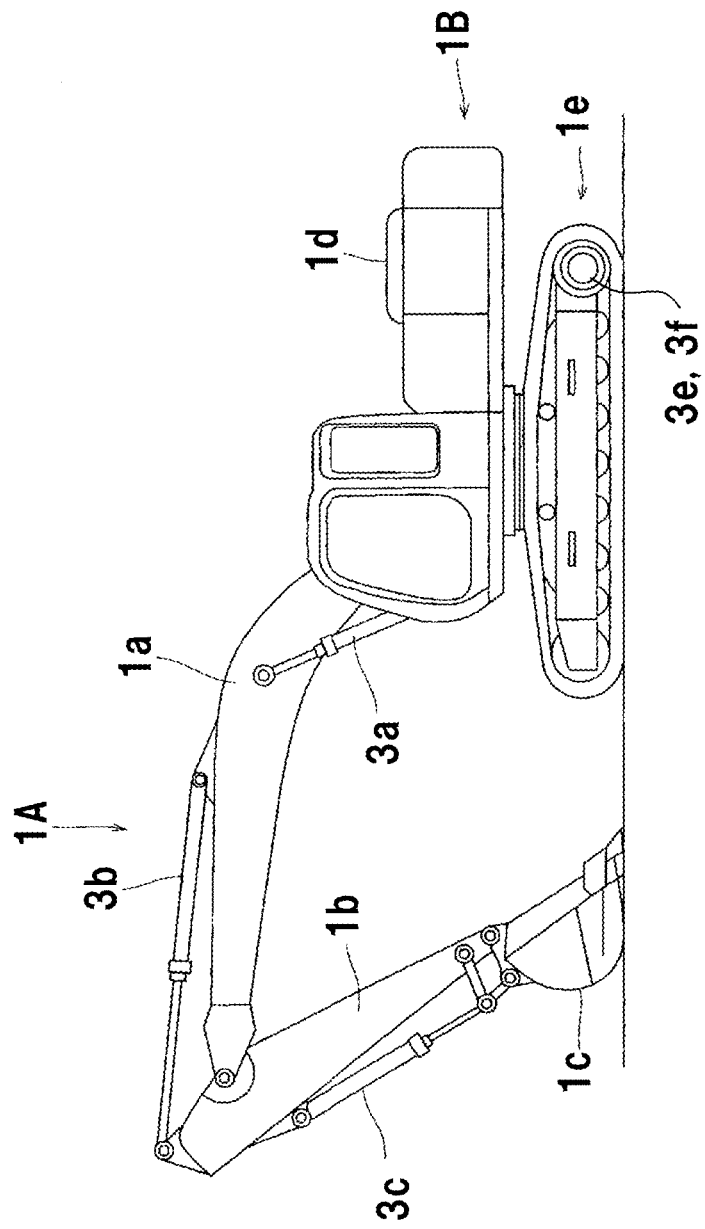
FIG. 1 is an external view of a hybrid hydraulic excavator according to an embodiment of the present invention.

FIG. 1 is an external view of a hybrid hydraulic excavator according to an embodiment of the present invention. The hydraulic excavator illustrated in FIG. 1 includes an articulated front work device 1A having a boom 1a, an arm 1b, and a bucket 1c and a vehicle body 1B having an upper swing structure 1d and a lower track structure 1e.

The boom 1a is pivotally supported by the upper swing structure 1d and is driven by a hydraulic cylinder (a boom cylinder) 3a. The arm 1b is pivotally supported by the boom 1a and is driven by a hydraulic cylinder (an arm cylinder) 3b. The bucket 1c is pivotally supported by the arm 1b and is driven by a hydraulic cylinder (a bucket cylinder) 3c. The upper swing structure 1d is swingably driven by an electric motor (a swing motor) 16 (see FIG. 2). The lower track structure 1e is driven by left and right hydraulic motors (track motors) 3e and 3f. The hydraulic cylinder 3a, the hydraulic cylinder 3b, the hydraulic cylinder 3c and hydraulic motors 3e, 3f are driven by hydraulic fluid pumped from a tank 8 (see FIG. 2) by a variable displacement hydraulic pump 6 (see FIG. 2).

Figure 2:
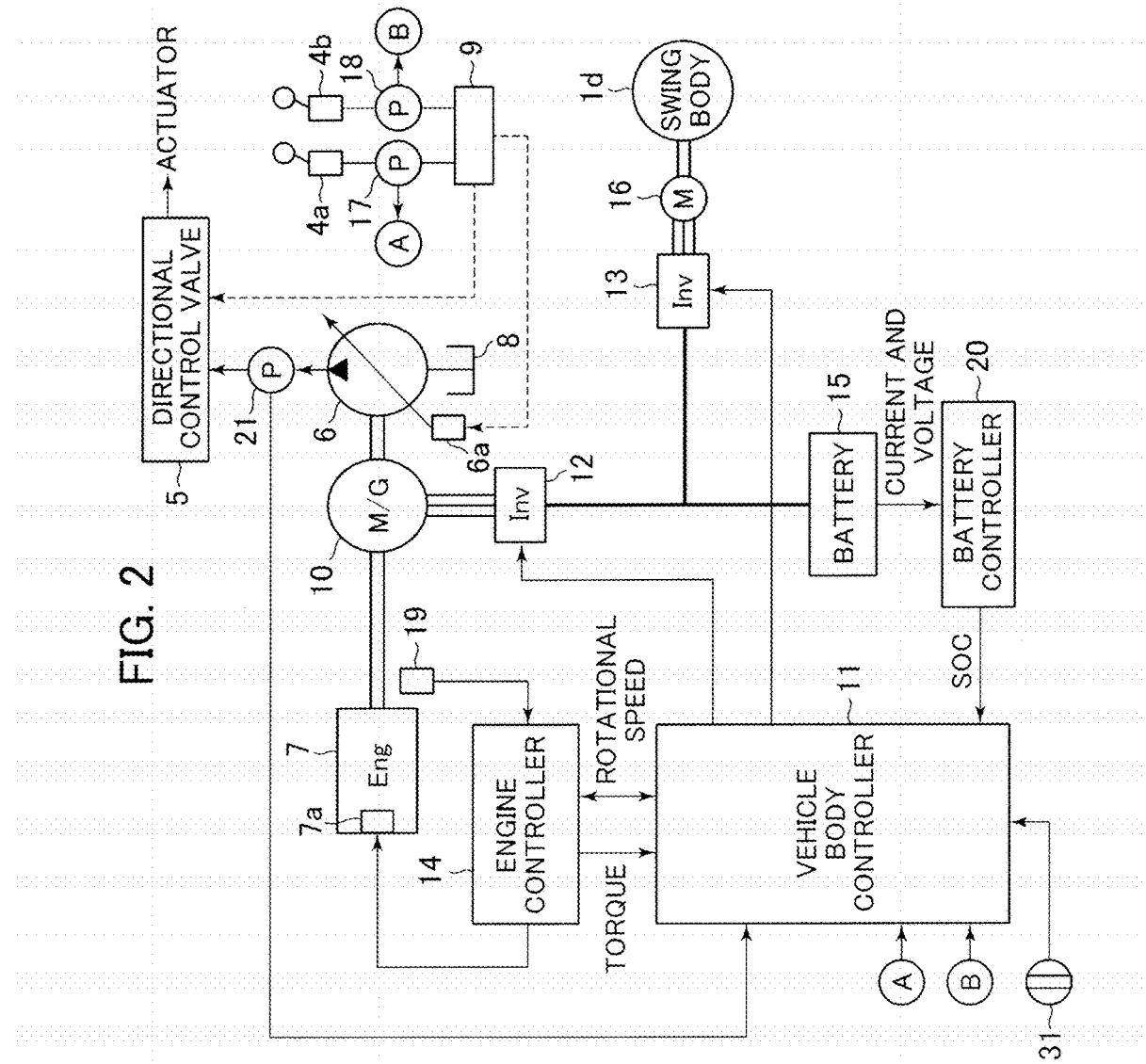
FIG. 2 is a schematic diagram of an actuator drive control system in the hybrid hydraulic excavator illustrated in FIG. 1.

FIG. 2 is a schematic diagram of an actuator drive control system in the hybrid hydraulic excavator illustrated in FIG. 1. The same parts as those illustrated in the previous figure are attached with like symbols and their explanations are appropriately omitted (the same applies to the following figures).

The actuator drive control system shown in this figure includes: an engine 7; an assist motor (a motor generator) 10 which transmits torque between the engine 7 and the assist motor; the variable displacement hydraulic pump 6 (which may simply be referred to as the hydraulic pump 6 hereinafter) driven by at least one of the engine 7 and the assist motor 10; hydraulic actuators (e.g., the hydraulic cylinders 3a, 3b, 3c and the hydraulic motors 3e, 3f) driven by the hydraulic fluid discharged from the hydraulic pump 6; a regulator (a pump controller) 6a to adjust the capacity of the hydraulic pump 6 for controlling absorption torque; a battery (an electric storage device) 15 in which electricity to be supplied to the assist motor 10, the swing electric motor 16 and the like is stored; an inverter (an electricity conversion device) 12 to control the assist motor and also to control the supply and reception of the electricity between the assist motor 10 and the battery 15; an inverter (an electricity conversion device) 13 to control the swing electric motor 16 and also to control the supply and reception of the electricity between the swing electric motor 16 and the battery 15; control levers (operation devices) 4a, 4b to output an operation signal for driving the hydraulic actuator and the swing electric motor 16 on the basis of an operation amount; an electronic governor 7a to adjust the fuel injection amount of the engine 7; a rotational speed sensor (actual rotational speed detecting means) 19 to detect the actual rotational speed of the engine 7; an engine controller 14 to control the rotational speed of the engine 7 through output; a vehicle body controller 11 to control the torque of the assist motor 10 and the swing electric motor 16 and the capacity of the hydraulic pump 6 through output; and a battery controller 20 to control charging and discharging of the battery 15 through output.

The operation of the boom 1a, the arm 1b, the bucket 1c and the upper swing structure 1d is commanded by the hydraulic operation signals (the control pilot pressures) of the control levers 4a, 4b. The operation of the lower track structure 1e is commanded by the hydraulic operation signal (the control pilot pressure) of an operation pedal device for travel (not shown).

The control levers 4a, 4b generate a control pilot pressure (a hydraulic control signal) by reducing the pressure from a primary pressure generated by the discharged fluid of a pilot pump (not shown) to a secondary pressure in accordance with an opening degree of a pressure reducing valve (a remote control valve) (not shown) installed in each of the control levers 4a, 4b. A shuttle valve block 9 selects and outputs for each of the control levers 4a, 4b a signal corresponding to the highest pressure among the hydraulic operation signals (the control pilot pressures) generated by the two control levers 4a, 4b. The hydraulic operation signal commanding swing operation will be excluded from the hydraulic operation signals output from the shuttle valve block 9 because it is detected by a pressure sensor 18.

The control pilot pressure output from the shuttle valve block 9 is sent to the pressure-receiving portion of a directional control valve 5 which is then switched from an illustrated neutral position. For example, the directional control valve 5 is a spool valve that has its center open and is disposed on a center bypass line in which the discharge fluid from the hydraulic pump 6 flows. The directional control valve 5 is operatively switched by the above control pilot valve to control the flow (direction and flow rate) of the hydraulic fluid discharged by the hydraulic pump 6, thus controlling the drive of the hydraulic actuators 3a to 3c. The hydraulic pump 6 is rotated and driven using the power of the engine 7 and/or the assist motor 10.

The hydraulic pump 6, a variable displacement pump, has a positive control regulator 6a. The regulator 6a receives a hydraulic operation signal output from the shuttle valve block 9. As heretofore known in the art, the positive control regulator 6a raises the swash plate tilting angle (capacity) of the hydraulic pump 6 to increase the discharge flow rate of the hydraulic pump 6 as the operation amount (required flow rates) of the control lever and the pedal, which are members of the control levers 4a, 4b and the control pedal, become larger and the hydraulic operation signals rise.

As heretofore known in the art, the regulator 6b has a function to limit torque, which reduces the tilting angle (capacity) of the hydraulic pump 6 as the discharge pressure of the hydraulic pump 6 becomes higher, and thus controls the absorption torque of the hydraulic pump 6 not to exceed a preset maximum torque.

The assist motor (the motor generator) 10 is mechanically connected to the hydraulic pump 6 and the engine 7. The assist motor 10 has a function to convert the power of the engine 7 to electric energy (electricity) and send it to the inverter 12. The assist motor 10 also has a function as an electric motor which is driven by the electric energy (electricity) supplied from the inverter 12 to assist-drive the hydraulic pump 6.

When the assist motor 10 functions as a generator, the inverter 12 converts the AC power generated by the assist motor 10 into DC power and outputs it. When the assist motor 10 functions as an electric motor, the inverter 12 converts the DC power from the battery 15 into AC power and supplies it to the assist motor 10.

The inverter 13 converts the DC power generated by the assist motor 10 and sent from the inverter 12 into the AC power and supplies it to the swing electric motor 16. The swing electric motor 16 drives the upper swing structure 1d. The inverter 13 converts the AC power, regenerated by the swing electric motor 16 functioning as a generator during swing braking, into DC power and outputs it.

The battery 15 is adapted to supply electricity to the inverters 12, 13 and store the electric energy generated by the assist motor 10 and the electric energy from the swing electric motor 16. The battery controller 20 has a function to detect the voltage and current of the battery 15 via sensors, estimate the amount of the electric energy stored in the battery 15, i.e., the state of charge (SOC), and send the estimated value to the vehicle body controller 11.

The engine controller (the engine control unit) 14 calculates a deviation between a target rotational speed from the vehicle body controller 1 and the actual rotational speed of the engine 7 detected by a rotational speed sensor 19. Then, the engine controller 14 calculates a target fuel injection amount on the basis of such a rotational speed deviation and outputs the control signal corresponding to the calculated amount to the electronic governor 7a provided for the engine 7. The electronic governor 7a is consequently operated by the control signal to inject and supply the fuel corresponding to the target fuel injection amount to the engine 7. In this way, the rotational speed of the engine 7 is controlled so as to maintain the target rotational speed.

The target rotational speed sent to the engine controller 14 from the vehicle body controller 11 is determined in accordance with the output from an engine control dial (an EC dial), which is an input device (a target rotational speed input device) into which the target rotational speed of the engine 7 is selectively input by an operator. However, the vehicle body controller 11 may appropriately change the target rotational speed selected at an EC dial 31 in accordance with the condition of the hydraulic excavator (e.g., the cooling water temperature of the engine 7 and the load of the engine 7), the target rotational speed being sent from the vehicle body controller 11 to the engine controller 14. In any case, the vehicle body controller 11 sets the target rotational speed on the basis of the operator's command including the EC dial 31 and the conditions of the hydraulic excavator. Then, the engine controller 14 sends the command signal of the fuel injection amount as a target to the electronic governor 7a so as to have such a rotational speed.

The vehicle body controller 11 has a control calculation circuit. This control calculation circuit exercises the following control (1) to (3) relating to the assist motor 10 and the swing electric motor 16.

(1) The Drive Control of the Swing Electric Motor 16

The pressure sensor 18 is installed in a pilot hydraulic line through which a hydraulic operation signal passes and detects such a hydraulic operation signal. This hydraulic operation signal commands the swing operation (i.e., the operation of the swing electric motor 16) in the left-right direction among the hydraulic operation signals created by the control lever 4b. The vehicle body sensor 11 receives the detection signal (the electric signal) of the pressure sensor 18 and controls the drive of the swing electric motor 16 in response to the detected hydraulic operation signal. Specifically, when the pressure sensor 18 detects the hydraulic operation signal commanding the leftward swing operation, the vehicle body controller 11 controls the inverter 13 on the basis of the hydraulic operation signal to exercise power running control to drive the swing electric motor 16. In this way, the swing electric motor 16 is operated so as to swing the upper swing structure 1d leftward at a speed corresponding to the hydraulic operation signal. When the pressure sensor 18 detects the hydraulic operation signal commanding the rightward swing operation, the vehicle body controller 11 controls the inverter 13 on the basis of the hydraulic operation signal to exercise power running control to drive the swing electric motor 16. In this way, the swing electric motor 16 is operated so as to swing the upper swing structure rightward at a speed corresponding to the hydraulic operation signal.

At the time of the above drive control of the swing electric motor 16 using the control lever 4b, the vehicle body controller 11 may exercise electricity generation control while referring to swing speed requirement, the state of charge (SOC) of the battery 15, the load of the hydraulic pump 6, or other values. Such electricity generation control is exercised by controlling the inverter 12 on the basis of the hydraulic operation signal detected by the pressure sensor 18 to operate the assist motor 10 as a generator. For example, if the swing speed requirement is relatively high, the drive control of the swing electric motor 16 and the electricity generation control of the assist motor 10 are exercised. If the swing speed requirement is relatively low, only the drive control of the swing electric motor 16 is exercised without the electricity generation control.

(2) Energy Storage Control of Recovered Electricity

At the time of braking of the upper swing structure (during the swing braking), the vehicle body controller 11 exercises such electricity generation control as to control the inverter 13 to operate the swing electric motor 16 as a generator. The vehicle body controller 11 consequently exercises such control as to recover the electric energy from the swing electric motor 16 and to store the recovered electric energy in the battery 15.

(3) Control of the Assist Motor 10 (the Energy Storage Management Control of the Battery 15)

The hydraulic load (pump absorption torque) of the hydraulic pump 6 may be light and the state of charge of the battery 15 detected by the battery controller 20 may be small. In such a case, the vehicle body controller 11 exercises such electricity generation control as to control the inverter 12 to operate the assist motor 10 as a generator. The vehicle body controller 11 consequently exercises such control as to generate surplus power and to store the surplus power thus generated in the battery 15. By contrast, the hydraulic load (pump absorption torque) of the hydraulic pump 6 may be heavy and the state of charge of the battery 15 detected by the battery controller 20 may not be smaller than a predetermined amount. In such a case, the vehicle body controller 11 exercises power running control to control the inverter 12 to supply the electric power of the battery 15 to the assist motor 10 so as to operate the assist motor 10 as an electric motor and thus assist-drive the hydraulic pump 6.

Figure 3:
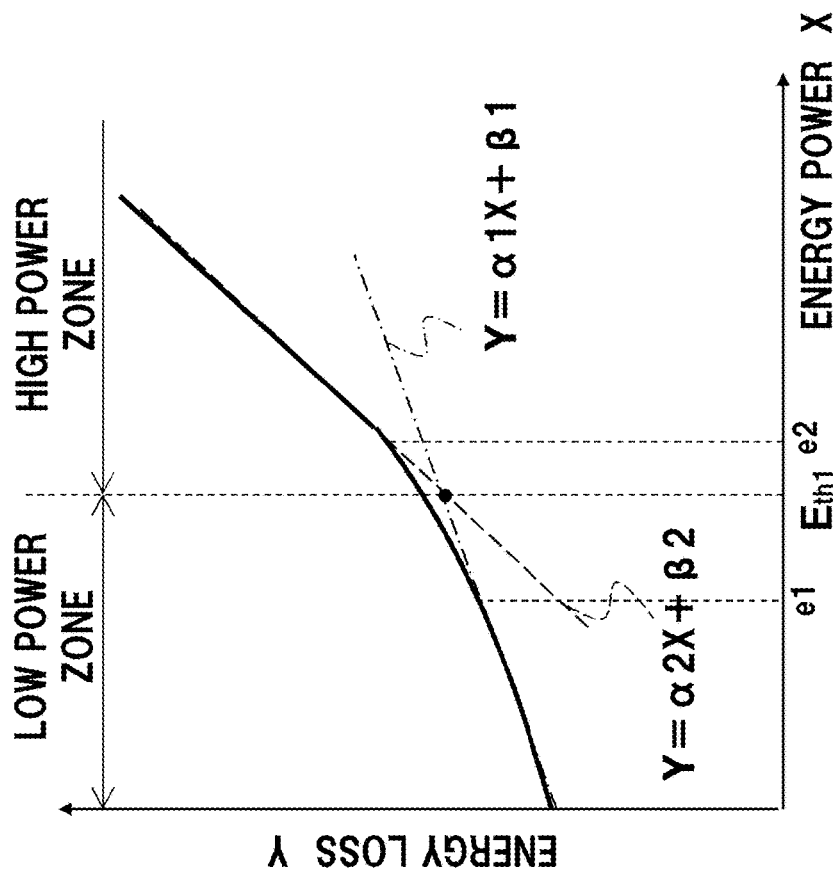
FIG. 3 is a graph showing one example of the relationship between energy taken out from energy input to an engine so as to rotate and drive a drive object and energy that cannot be used to rotate and drive the drive object.

If it is assumed that the input of the engine 7 is the thermal energy of fuel per hour, the relationship between energy (engine power X) capable of being taken out from the input in order to rotate and drive targets (the hydraulic pump 6 and the assist motor 10) and energy (energy loss Y) incapable of being used to rotate and drive the drive targets usually becomes the solid line of FIG. 3. Here, the graph of FIG. 3 is divided into two zones based on the magnitude of a rate (X/Y) of an increase in the energy loss to an increase in engine power in the solid line of FIG. 3. The value of the engine power serving as a border value between the two zones is referred to as "an electricity generation threshold value $E_{th1}$". In the present embodiment, two approximate straight lines relative to the solid line of FIG. 3 are set and an intersection of the two approximate straight lines is previously set as an electricity generation threshold value $E_{th1}$. An approximate expression in a low engine power side zone (a low power zone) is assumed as $Y=\alpha1X+\beta1$. An approximate expression in a high engine power side zone (a high power zone) is assumed as $Y=\alpha2X+\beta2$ ($\alpha1$, $\alpha2$, $\beta1$ and $\beta2$ are constants; $\alpha1<\alpha2$ and $\beta1>\beta2$).

In FIG. 3, in the zone (the lower power zone) on the lower power side of the electricity generation threshold value $E_{th1}$ out of the two zones divided with respect to the electricity generation threshold value $E_{th1}$, the approximate straight line ($Y=\alpha1X+\beta1$) having a relatively small inclination is set. As seen from this, the rate of increase in energy loss is relatively small ($\alpha1<\alpha2$). In the zone (the high power zone) on the high power side of the electricity generation threshold value $E_{th1}$, the approximate straight line ($Y=\alpha2X+\beta2$) having a relatively large inclination is set. As seen from this, the rate of increase in energy loss is larger ($\alpha1<\alpha2$). In other words, the electricity generation threshold value $E_{th1}$ is set so that the rate of the increase in energy loss when the engine power increases by a predetermined value in the range less than $E_{th1}$ is smaller the rate of the increase in energy loss when the engine power increases by the predetermined value in the range exceeding $E_{th1}$. In the high power zone, the relationship between the engine power and the energy loss is roughly linear and the sum of the engine power and the energy loss is the input. The efficiency, which is the rate of the engine power to the input, is thus roughly constant. By contrast, in the low power zone, the efficiency will be lower as the power is smaller. The intersection between the two approximate straight lines is set at the electricity generation threshold value $E_{th1}$, but the electricity generation threshold value $E_{th1}$ may be set at other values. For example, in FIG. 3, any value selected from values in a range from an engine power value (e1) at which the solid line starts being away from the approximate straight line ($Y=\alpha1X+\beta1$) to an engine power value (e2) at which the solid line coincides with the approximate straight line ($Y=\alpha2X+\beta2$) in the high power zone may be taken as the electricity generation threshold value $E_{th1}$. Although the electricity generation allowable range of the assist motor 10 becomes narrow, the electricity generation threshold value $E_{th1}$ may be set in the low power zone equal to or less than the engine power value (e1).

The characteristics shown in FIG. 3 are typically seen in diesel engines used in work machines including hydraulic excavators. In a large power zone near rating (a high power zone), adjusting hardware and software relating to EGR (exhaust recirculation), an air-fuel ratio and a turbocharger achieves desired fuel consumption and power, consequently making the energy loss roughly linear as described above. It is however difficult in the low power zone to obtain the same characteristics as in the high power zone at the same time. In particular, even idle operation, in which power is equal to zero, will consume fuel, and thus the energy loss will not become zero. As a result, in many engines, the relationship between the power and the loss will vary in a divided manner with a predetermined power value set as a border, as seen in FIG. 3.

When the battery 15 is charged through the electricity generation control to operate the assist motor 10 as a generator, the engine 7 drives the assist motor 10 in addition to the hydraulic pump 6. According to FIG. 3, also in this case, a loss depends on the power of the engine 7. For example, if the hydraulic load (absorption power) of the hydraulic pump 6 is at X1 (not shown) in the low power zone, and ΔX (not shown) is added for electricity generation, it is seen that the energy loss increases by $\alpha1\Delta X$ from the approximate straight line, which is $Y=\alpha1X+\beta1$, in the low power zone in FIG. 3 before and after the electricity generation. If the hydraulic load (absorption power) of the hydraulic pump 6 is X2 (not shown) in the high power zone, and ΔX (not shown) is further added for electricity generation, it is seen that the energy loss increases by $\alpha2\Delta X$ from the approximate straight line, which is $Y=\alpha2X+\beta2$, in the high power zone in FIG. 3. Because of $\alpha1<\alpha2$, the energy loss that increases when the electricity of the same ΔX is generated is less by $(\alpha2-\alpha1)\Delta X$ when the hydraulic load of the hydraulic pump 6 is X1 in the low power zone than when it is X2 in the high power zone.

The increase in energy loss directly leads to the increase in the input to the engine. The input corresponds to (the calorific value of) fuel; smaller increase in loss relative to the amount of electricity generation makes an influence of electricity generation on fuel consumption weaker. Thus, in charging the battery 15, the engine 7 with the characteristics in FIG. 3 will have better fuel consumption by generating electricity when the engine power is equal to or less than the electricity generation threshold value $E_{th1}$ than when the engine power is greater than the electricity generation threshold value $E_{th1}$.

In the energy storage control of the recovery power in above (2), it is during swing braking that electricity can be charged. This means that the timing of the charge depends on the swing operation. In the energy storage management control in above (3), however, electricity can be charged whenever the hydraulic load (the absorption power) of the hydraulic pump 6 is smaller than the maximum power of the engine. Thus, in the energy storage management control in above (3), the battery is selectively charged when the power of the engine is relatively small taking into account the characteristics of the engine 7 in FIG. 3. Moreover, the battery is not charged when the power of the engine is relatively large. The fuel consumption of the work machine will improve accordingly.

Figure 4:
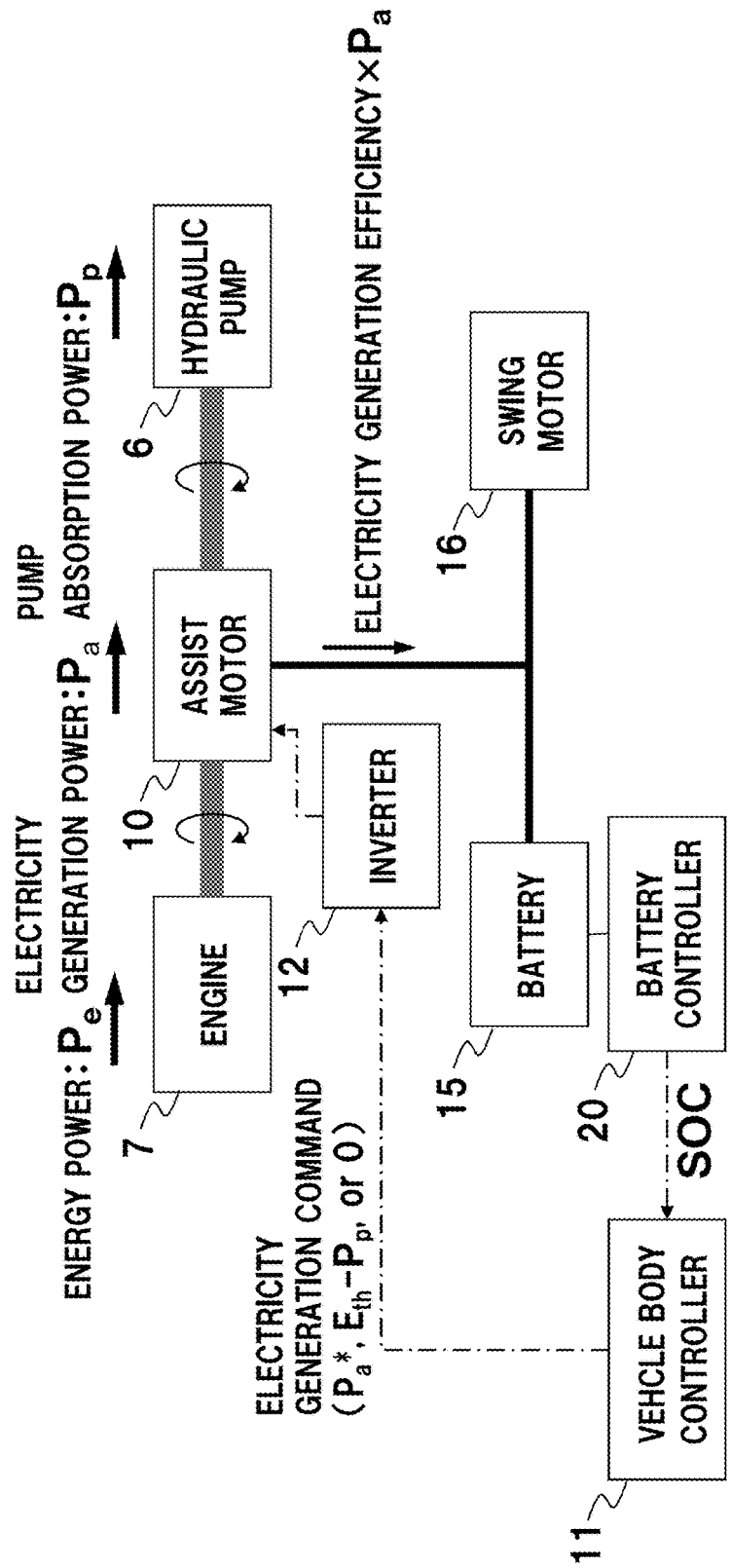
FIG. 4 shows power input and output in the actuator drive control system of FIG. 2 during the electricity generation using an assist motor.

FIG. 4 shows the power input and output in the actuator drive control system in FIG. 2 during the electricity generation of the assist motor 10. As shown in this figure, the system of FIG. 2 is such that during the electricity generation of the assist motor 10, the power output from the engine 7 (engine power: Pe) is used as power for rotating the hydraulic pump 6 (the pump absorption power: Pp) and power for rotating the assist motor 10 during the electricity generation (electricity generation power: Pa). In short, "Pe=Pp+Pa" is established.

Figure 5:
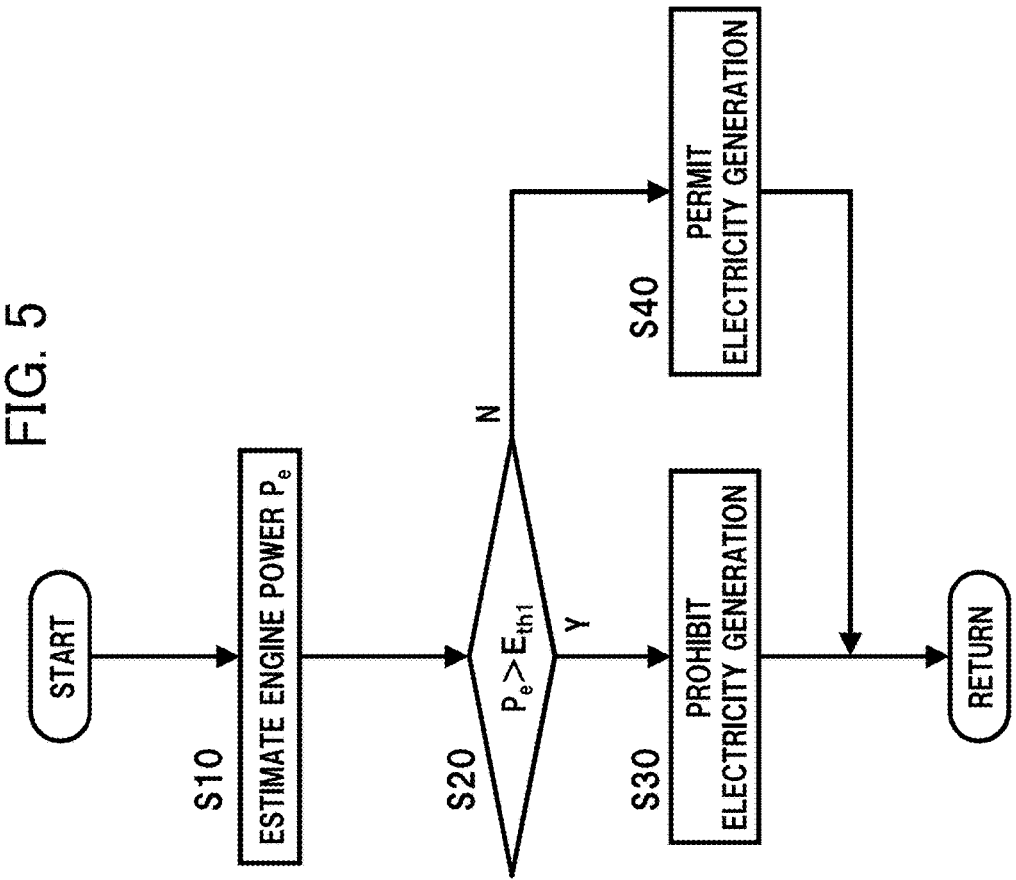
FIG. 5 is a first flowchart showing charging algorithm of a battery using the assist motor in the energy storage management control using a vehicle body controller.

A description is given of a method of charging the battery 15 with fuel consumption taken into account while using the above equation. FIG. 5 is a first flowchart showing an algorithm for the charge of the battery 15 using the assist motor 10. This flowchart is periodically repeated.

In step S10, the vehicle body controller 11 first estimates the engine power Pe of the engine 7 requested by the hydraulic pump 6 and the assist motor 10. Examples of the method of estimating the engine power Pe by the vehicle body controller 11 include the following three: (A) to (C).

(A) Method of using the Output of the Engine Controller 14

As described above, the engine controller 14 calculates a target amount of fuel injection of the engine 7. It is known in the art that an amount of fuel injection of an engine roughly corresponds to the torque of the engine. A map showing the relationship between the amount of fuel injection and torque is usually used in the art. Referring to the map, the torque of the engine 7 is estimated from the target amount of fuel injection calculated by the engine controller 14. The engine controller 14 outputs to the vehicle body controller 11 the estimated torque and the rotational speed input from the rotational speed sensor 19. The vehicle body controller 11 calculates the product of the torque and the rotational speed, thus making it possible to calculate the estimated value of the engine power Pe.

(B) Method of Estimation from the Sum of the Absorption Power Pp of the Hydraulic Pump 6 and the Power Required to Generate Electricity of the Assist Motor 10

Before this method is explained, a method of estimating the absorption power Pp of the hydraulic pump 6 will now be described. For such an estimation, the vehicle body controller 11 first estimates the flow rate of the hydraulic pump 6. To calculate the estimated value of the flow rate of the hydraulic pump 6, the pressure sensors 17, 18 detect the control pilot pressures by the control levers 4a, 4b and output them to the vehicle body sensor 11. As described above, the control pilot pressures are led to the regulator 6a through the shuttle valve block 9 to increase or decrease the swash plate tilting angle (capacity) of the hydraulic pump 6. The vehicle body controller 11 then calculates the detected value of the control pilot pressure in accordance with the operation of the hydraulic circuit and also calculates the hydraulic operation signal supplied to the regulator 6a. In this way, the vehicle body controller 11 estimates the flow rate of the hydraulic pump 6. The product of the estimated value of the flow rate and the discharge pressure of the hydraulic pump output from the pressure sensor 21 to the vehicle body controller 11 is divided by the efficiency of the hydraulic pump 6. The absorption power Pp of the hydraulic pump 6 is calculated accordingly.

Figure 6:
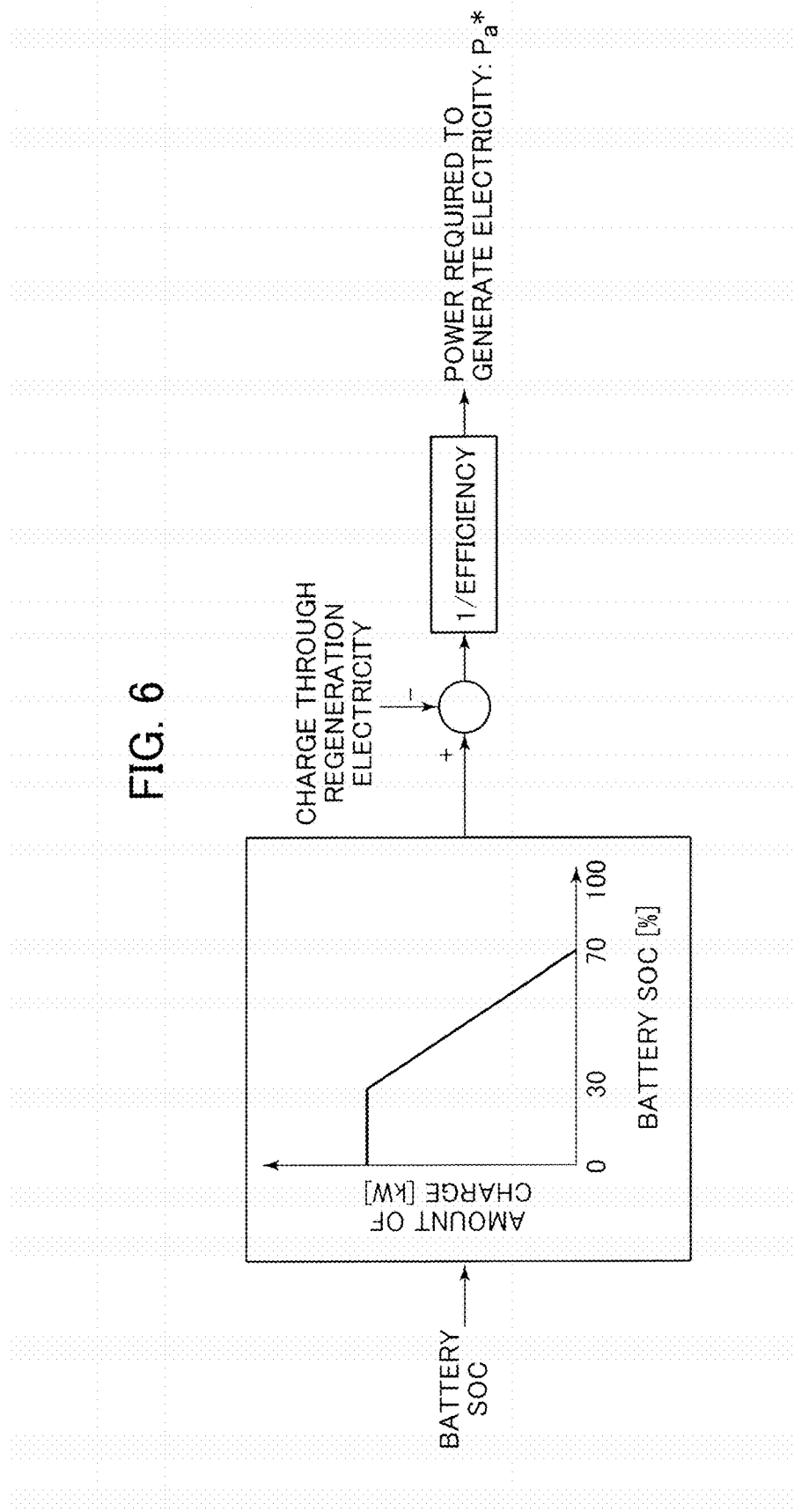
FIG. 6 shows a calculation process of power Pa* required to generate electricity of the assist motor using the vehicle body controller.

The calculation of the power Pa* of the assist motor 10 will now be described with reference to FIG. 6. FIG. 6 is a diagram showing the calculation process of the power Pa* of the assist motor 10 using the vehicle body controller 11.

As shown in the figure, the vehicle body controller 11 first determines a target amount of charge on the basis of the state of charge (i.e., SOC) of the battery 15 input from the battery controller 20. It is desirable that the battery 15 according to the present embodiment be mainly charged and discharged in a range of SOC from 30 to 70%. In the example of FIG. 6, the target amount of charge is set to the maximum value in a range of SOC equal to or less than 30%. The target amount of charge is gradually reduced with the increased SOC in a range of SOC between 30 to 70%. The target amount of charge is set to zero in a range of SOC equal to or greater than 70%. Taking into account the charge through the recovery electricity by the swing electric motor 16, a difference between the above target amount of charge and the amount of charge through the regenerated electricity is taken as the amount of charge by the assist motor 10. The power Pa* required to generate electricity is power to be supplied to the assist motor 10 by the engine 7. Thus, the power Pa* required to generate electricity is calculated by dividing the difference between the target amount of charge and the amount of charge through the regeneration power by the product of the efficiencies of the assist motor 10 and the inverter 12 and the efficiency of the battery 15 at the time of charge.

The estimated value of the engine power Pe is calculated by calculating the sum of the absorption power Pp of the hydraulic pump 6 calculated as above and the power Pa* of the assist motor 10.

(C) Method of Estimation from the Control Pilot Pressures of the Control Levers 4a, 4b In this method, if the control levers 4a, 4b are determined not to be in operation, it is estimated that the hydraulic excavator is not working and the engine power Pe is regarded as 0. On the other hand, if that the control levers 4a, 4b are determined to be in operation, the engine power Pe is regarded as the maximum value because the hydraulic excavator is working for some purpose. At the same time, the presence or absence of the operation of the control levers 4a, 4b is determined from the magnitudes of the control pilot pressures detected by the pressure sensors 17, 18. If the control pilot pressures are equal to or less than a preset value (e.g., 0.5 MPa), it is determined that the control levers 4a, 4b are not in operation. If the control pilot pressures exceed the preset value, it is determined that the control levers 4a, 4b are in operation.

As described above, the engine power Pe is estimated in S10 by any one of methods (A) to (C) and then the algorithm proceeds to step S20. It is determined whether the engine power Pe calculated in S10 is greater than the electricity generation threshold value $E_{th1}$. In step S20, if it is determined that the engine power Pe is greater than the electricity generation threshold value $E_{th1}$, the vehicle body controller 11 permits the electricity generation of the assist motor 10 (step 30). In other words, if the assist motor 10 is requested to generate electric power, control is exercised to ignore such a request so as not to generate electricity.

On the other hand, in S20, if it is determined that the engine power Pe is equal to or less than the electricity generation threshold value $E_{th1}$, the vehicle body controller 11 permits the assist motor 10 to generate electricity (step S40). In other words, if the assist motor 10 is requested to generate electricity, the vehicle body controller 11 sends to the inverter 12 a request to generate electricity to supply such power as the request to generate electricity (i.e., the power Pa* required to generate electricity) as the electricity generation power of the assist motor 10. After steps S30 and S40, the algorithm returns to the start and repeats the processing after S10.

As described above, when the assist motor 10 is requested to generate electricity in the present embodiment, the power Pe that the engine 7 is required to output is estimated to meet the request to generate electricity and achieve the operation of the hydraulic pump 6. Only if the engine power Pe is equal to or less than the electricity generation threshold value $E_{th1}$, the electricity generation of the assist motor 10 is permitted. If the electricity generation control is exercised in this manner, the electricity will be generated by the assist motor 10 only in the low power zone in which an energy loss is relatively small (see FIG. 3). In addition, the electricity generation of the assist motor 10 will not be allowed in the high power zone in which the energy loss is relatively large (see FIG. 3). Therefore, the fuel consumption of the engine 7 when the battery 15 is charged will be reduced, and the fuel consumption of the hybrid hydraulic excavator will improve.

Assume above method (C) is selected in estimating the engine power Pe in step S10. When the control levers 4a, 4b are operated, the engine power Pe is constantly greater than the electricity generation threshold value $E_{th1}$. The charge by the assist motor 10 is carried out only when the control levers 4a, 4b are not being operated (that is, when no work is in process).

Figure 7:
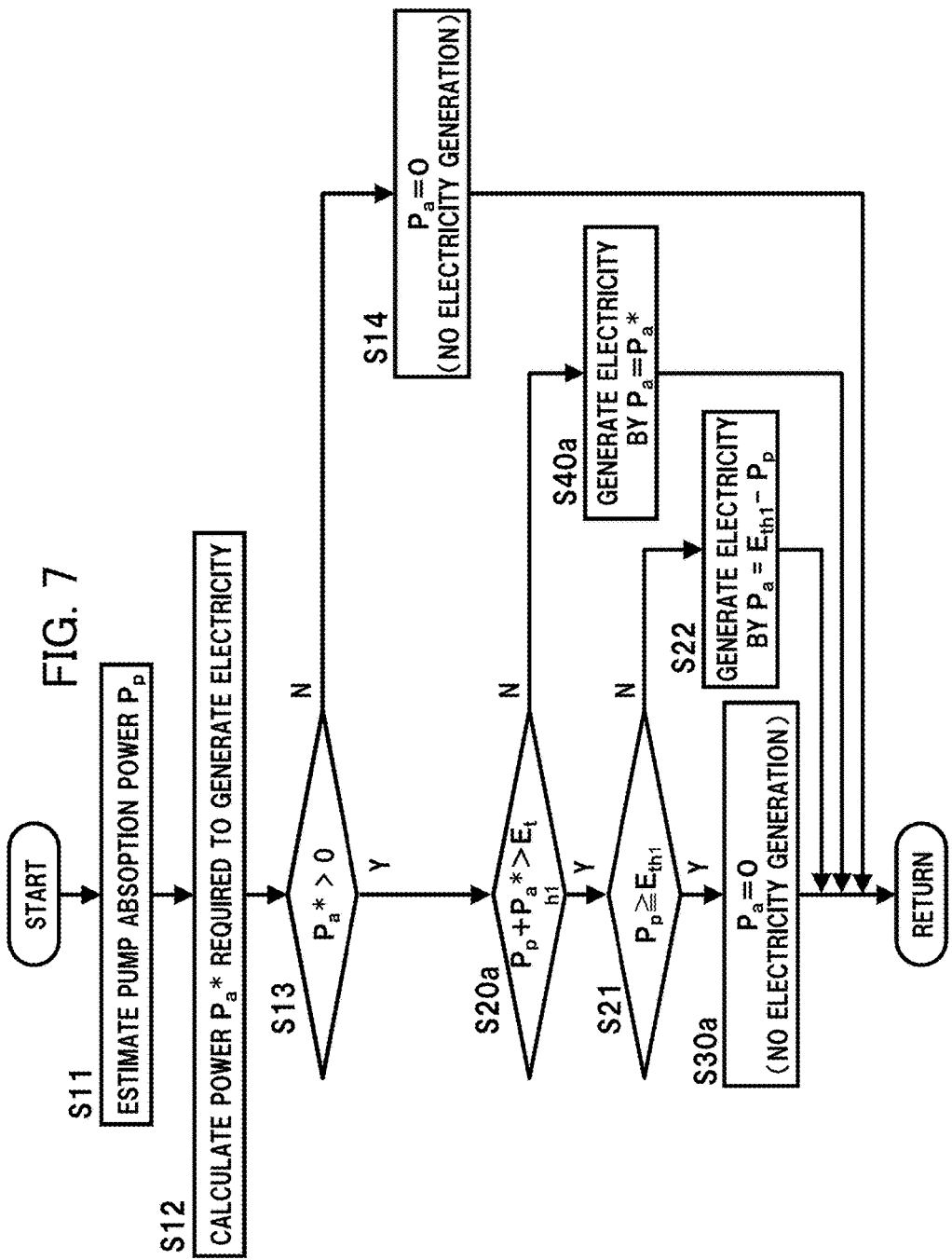
FIG. 7 is a second flowchart showing charging algorithm of the battery using the assist motor in the energy storage management control using the vehicle body controller.

A second embodiment according to the present invention will now be described. FIG. 7 is a second flowchart showing the charge algorithm of the battery 15 using the assist motor 10 in the energy storage management control exercised by the vehicle body controller 11. This flowchart is periodically repeated.

In step S11, the vehicle body controller 11 estimates the absorption power Pp of the hydraulic pump 6. The pump absorption power Pp is calculated through the processing described in above method (B) of estimating the engine power Pe. Specifically, the estimated value of the absorption power Pp of the hydraulic pump 6 is calculated based on the control pilot pressures of the control levers 4a, 4b detected by the pressure sensors 17, 18 and the discharge pressure of the hydraulic pump 6 detected by the pressure sensor 21.

In step 12, the vehicle body controller 11 subsequently calculates the power Pa* of the assist motor 10. Also the power Pa* required to generate electricity is calculated through the processing in method (B) of estimating the engine power Pe. Specifically, the power Pa* required to generate electricity is calculated based on the SOC of the battery 15 and the amount of charge through regenerated electricity.

In step S13, the vehicle body controller 11 determines whether the power Pa* required to generate electricity calculated in S12 is greater than zero. If the power Pa* required to generate electricity is equal to zero, charge is not necessary, and the assist motor 10 does not generate electricity (S14). If the power Pa* required to generate electricity is greater than zero in S13, the algorithm proceeds to step S20a.

In step S20a, the sum of the estimated value of the pump absorption power Pp calculated in S11 and the power Pa* required to generate electricity calculated in S12 is calculated. In addition, it is determined whether the engine power Pe, which corresponds to that sum, is greater than $E_{th1}$.

In S20a, if it is determined that the engine power Pe is equal to or less than the electricity generation threshold value $E_{th1}$, the vehicle body controller 11 outputs to the inverter 12 an electricity generation command to supply such power (i.e., power Pa* required to generate electricity) as the request to generate electricity as the electricity generation power Pa of the assist motor 10 (step S40a).

On the other hand, in S20a, if it is determined that the engine power Pe is greater than the electricity generation threshold value $E_{th1}$, it is determined whether the pump absorption power Pp calculated in S11 is equal to or greater than the electricity generation threshold valve $E_{th1}$ (S21).

In S21, if it is determined that the pump absorption power Pp is smaller than the electricity generation threshold value $E_{th1}$, the vehicle body controller 11 outputs to the inverter 12 an electricity generation command to supply the power resulting from subtracting the pump absorption power Pp from the electricity generation threshold value (i.e., $E_{th1}$–Pp) as the electricity generation power Pa of the assist motor 10 (step S22). Specifically, in this case, the sum of the pump absorption power Pp and the power Pa* required to generate electricity exceeds the electricity generation threshold value $E_{th1}$. However, the pump absorption power Pp smaller than the electricity generation threshold value $E_{th1}$ is output on a priority basis. The electricity generation power Pa is limited to the power resulting from subtracting the pump absorption power Pp from the electricity generation threshold value $E_{th1}$. In this way, the actual engine power is limited to the electricity generation value $E_{th1}$ through the control.

On the other hand, if it is determined that the pump absorption power Pp is equal to or greater than the electricity generation threshold value $E_{th1}$, the vehicle body controller 11 outputs to the inverter 12 an electricity generation command to make the electricity generation power Pa of the assist motor 10 equal to zero. In this way, the assist motor 10 is not allowed to generate electricity (step S30a). Specifically, in this case, the electricity generation threshold value $E_{th1}$ is reached by the pump absorption power Pp alone which is subsequently output from the engine 7. In addition, control not to output the electricity generation power Pa at all under the request to generate electricity exercised. Although the actual engine power exceeds the electricity generation threshold value $E_{th1}$, the engine power corresponding to the excessive portion is controlled to a value necessary to drive the hydraulic pump 6.

After the processing of steps S14, S40a, S22 and S30a, the algorithm returns to the start and repeats the processing after S11.

Also in the present embodiment as described above, the assist motor 10 generates electricity only in the low power zone in which an energy loss is relatively small. The assist motor 10 is not allowed to generate electricity in the high power zone in which the energy loss is relatively large. The fuel consumption of the engine 2 when the battery 15 is charged is reduced, thus improving the hybrid hydraulic excavator. Particularly in the present embodiment, the sum of the pump absorption power Pp and the power Pa* required to generate electricity may exceed the electricity generation threshold value $E_{th1}$. Yet as long as pump absorption power Pp is not be greater than the electricity generation power $E_{th1}$, only the amount of electricity would be generated by a difference between both of them. There will be more opportunities of charge than in the first embodiment, thus preventing the state of charge from further decreasing.

In step S22 in the present embodiment, the electricity generation command to supply the power resulting from subtracting the pump absorption power Pp from the electricity generation threshold value $E_{th1}$ ($E_{th1}$–Pp) is output to the inverter 12. The electricity generation command is not limited to this. The electricity generation command may be one needed to supply power "equal to or less than" the power resulting from subtracting the pump absorption power Pp from the electricity generation threshold value $E_{th1}$.

Figure 8:
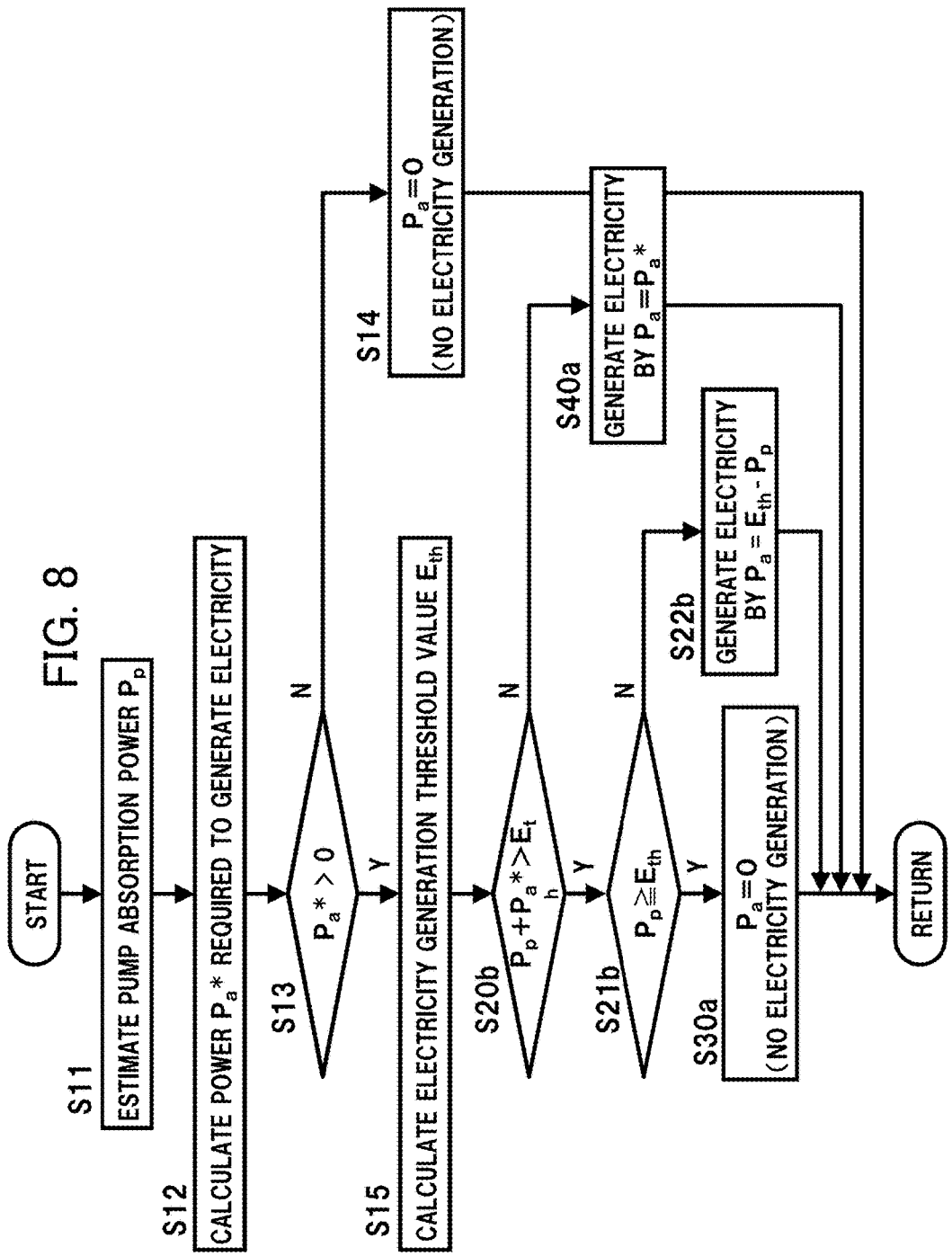
FIG. 8 is a third flowchart showing charging algorithm of the battery using the assist motor in the energy storage management control using the vehicle body controller.

A third embodiment according to the present invention will now be described. The present embodiment is characterized in that an electricity generation threshold value $E_{th}$ varies in accordance with the SOC of the battery 15. FIG. 8 is a third flowchart showing an algorithm for charging the battery 15 by the assist motor 10 out of the energy storage management control by the vehicle body controller 11. This flowchart is periodically repeated.

The charge algorithm from step S11 to step S14 is the same as that in FIG. 7, and their explanation is thus omitted. If the power Pa* required to generate electricity is greater than zero in step S13, the charge algorithm proceeds to step S15. The vehicle body controller 11 calculates the electricity generation threshold value $E_{th}$ used in the subsequent processing on the basis of SOC.

Figure 9:
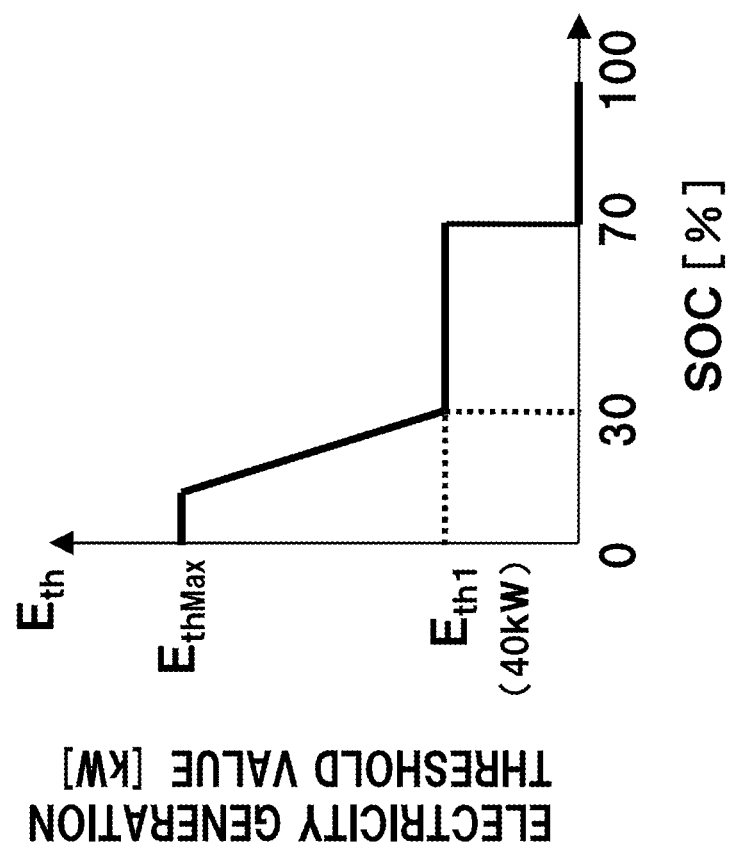
FIG. 9 shows one example of a map used to calculate an electricity generation threshold value $E_{th}$ in step S15 in FIG. 8.

FIG. 9 shows one example of maps used to calculate the electricity generation threshold value $E_{th}$ in step S15 in FIG. 8. Based on the map shown in the figure, the vehicle body controller 11 determines the electricity generation threshold value $E_{th}$ from the SOC of the battery 15.

In the example of this figure, an electricity generation threshold value is set at $E_{th1}$ with a small energy loss similarly to the previous embodiments in a range from 30% to 70% in which SOC is ideal.

In the range in which SOC is equal to or greater than 70%, the assist motor 10 does not need to generate electricity, and thus the electricity generation threshold value $E_{th}$ is set to zero. This means the assist motor 10 does not generate electricity constantly. It is noted that if the map of FIG. 6 is used to calculate the power Pa* required to generate electricity, the power Pa* required to generate electricity becomes equal to zero when SOC is equal to or greater than 70%. Inequalities among each control will not occur for this reason.

In a range in which SOC is smaller than 30%, electricity generation would be necessary, although the energy loss may increase. The electricity generation threshold value $E_{th}$ is set to increase in accordance with a reduction in SOC. In the example of FIG. 9, the electricity generation threshold value increases to $E_{thMax}$ (the maximum value) in accordance with the reduction in SOC. There will be more opportunities of charge by the assist motor 10 to prevent the SOC from further decreasing.

In S15, the electricity generation threshold value $E_{th}$ is calculated and then the algorithm proceeds to step S20b. In step S20b, it is determined whether the sum (the engine power Pe) of the estimated value of the pump absorption power calculated in S11 and the power Pa* required to generate electricity is greater than the electricity generation threshold value $E_{th}$ calculated in S15.

In S20b, it may be determined that the engine power Pe is equal to or less than the electricity generation threshold value $E_{th}$. In such a case, the vehicle body controller 11 outputs to the inverter 12 an electricity generation command to supply such power as to meet the request to generate electricity (i.e., the power Pa* required to generate electricity) serving as the electricity generation power Pa of the assist motor 10 (step S40a).

By contrast, if the engine power Pe is determined to be greater than the electricity generation threshold value Eth in step S20b, it is determined whether the pump absorption power Pp calculated in S11 is equal to or greater than the electricity generation threshold value $E_{th}$ (S21b).

In S21b, it may be determined that the pump absorption power Pp is smaller than the electricity generation threshold value $E_{th}$. In such a case, the vehicle body controller 11 outputs to the inverter 12 an electricity generation command to supply the power (i.e., $E_{th}$-Pp) resulting from subtracting the pump absorption power Pp from the electricity generation threshold value $E_{th}$ as the electricity generation power Pa of the assist motor 10 (step S22b). That is to say, the sum of the pump absorption power Pp and the power Pa* required to generate electricity exceeds the electricity generation threshold value $E_{th}$. However, the pump absorption power Pp smaller than the electricity generation threshold value $E_{th}$ is output on a priority basis. The electricity generation power Pa is limited to the power resulting from subtracting the pump absorption power Pp from the electricity generation threshold value $E_{th}$. The actual engine power is limited to the electricity generation threshold value $E_{th}$ through the control accordingly.

It may be determined that the pump absorption power Pp may not be smaller than the electricity generation threshold value $E_{th}$ in S21b. In such a case, the vehicle body controller 11 outputs to the inverter 12 the electricity generation command to make the electricity generation power Pa of the assist motor 10 equal to zero. In addition, it disables the assist motor 10 to generate electricity (step S30a).

After the processing of steps S14, S40a, S22 and S30a, the algorithm returns to the start and repeats the processing after S11.

According to the present embodiment, the assist motor 10 generates electricity mainly in the low power zone with a relatively small energy loss. In addition, the assist motor 10 is not allowed to generate electricity as much as possible in the high power zone with a relatively large energy loss. The fuel consumption of the engine 7 is reduced accordingly when the battery 15 is charged, and thus the fuel consumption of the hybrid hydraulic excavator improves. Particularly in the present embodiment, if SOC reaches a level smaller than 30%, the electricity generation threshold value $E_{th}$ is set at a value greater than $E_{th1}$. The charge of the battery 15 takes priority over the energy loss. There will be more opportunities of charge than in the previous embodiments, thus preventing the reduction in the SOC of the battery 15.

The embodiments have described the hybrid hydraulic excavator as the work machine. However, the present invention can be applied to work machines other than the hydraulic excavator as long as the work machines have a hydraulic pump and an assist motor (a motor generator) connected to an engine.

The present invention is not limited to the above embodiments and may embrace varieties of modifications without departing from the spirit of the invention. The embodiments, for example, have only been described in detail for a better understanding of the invention and are therefore not necessarily limited to the configurations containing all described constituent elements. In addition, part of the configuration of a certain embodiment may be replaced by the configuration of another embodiment and the configuration of a certain embodiment may be added to the configuration of another embodiment. Furthermore, part of the configuration of one of the embodiments may be added to or replaced by the other embodiments.

Note also that some or all of the aforementioned components, functions, processors, and the like relating to the above controllers 11, 14, 20 can be implemented by hardware such as an integrated circuit (for example, logics to have the functions may be designed into an integrated circuit). Alternatively, those components, functions, and the like relating to the above controllers 11, 14, 20 can be implemented by programs (software) as well. In the latter case, an arithmetic processor (e.g., CPU) can interpret and execute the programs designed to serve those functions. Information on such programs may be stored, for example, in a semiconductor memory (including a flash memory and SSD), a magnetic storage device (including a hard disk drive), or a recording medium (including a magnetic disk and an optical disk and the like).

Further note that the control lines and information lines shown above represent only those lines necessary to illustrate the present invention, not necessarily representing all the lines required in terms of products. Thus, it can be assumed that almost all the components are in fact interconnected.

DESCRIPTION OF REFERENCE CHARACTERS

3a . . . boom cylinder
3b . . . arm cylinder
3c . . . bucket cylinder
3e, 3f . . . travel motor
4a, 4b . . . control lever
5 . . . directional control valve
6 . . . hydraulic pump
6b . . . regulator
7 . . . engine
7a . . . electronic governor
8 . . . tank
9 . . . shuttle valve block
10 . . . assist motor
11 . . . vehicle body controller
12, 13 . . . inverter
14 . . . engine controller
15 . . . battery
16 . . . swing electric motor
17, 18 . . . pressure sensor
19 . . . rotational speed sensor
20 . . . battery controller
31 . . . engine control dial $E_{th}$, $E_{th1}$, $E_{thMax}$ ... electricity generation threshold value
Pa ... electricity generation power
Pa* ... power required to generate electricity
Pe ... engine power
Pp ... pump absorption power

The invention claimed is:

1. A hybrid work machine comprising:
an engine;
a motor generator for generating electricity by using power of the engine;
a hydraulic pump operated by using the power of the engine and/or the motor generator; and
a controller configured to estimate an engine power requirement that is power required of the engine when a request to generate electricity is sent to the motor generator, and permit the motor generator to generate electricity only when the engine power requirement is equal to or less than a preset threshold value,
wherein the threshold value is set so that a rate of an increase in energy loss when the power of the engine increases by a predetermined value in a range smaller than the threshold value is smaller than a rate of an increase in energy loss when the power of the engine increases by the predetermined value in a range exceeding the threshold value.

2. The hybrid work machine according to claim 1,
wherein the controller calculates, at a time of sending the request to generate electricity, a hydraulic pump power requirement that is a power required by the hydraulic pump for the engine and a motor generator power requirement that is a power required by the motor generator for the engine,
wherein the controller subsequently calculates the engine power requirement based on a sum of the hydraulic pump power requirement and the motor generator power requirement, and
wherein the controller outputs to the motor generator a command as the request to generate electricity to generate electricity by supplying the motor generator power requirement from the engine to the motor generator when the engine power requirement is equal to or less than the threshold value.

3. The hybrid work machine according to claim 1,
wherein the controller calculates, at the time of sending the request to generate electricity, a hydraulic pump power requirement that is a power required by the hydraulic pump for the engine, and a motor generator power requirement that is a power required by the motor generator for the engine,
wherein the controller subsequently calculates the engine power requirement based on the sum of the hydraulic pump power requirement and the motor generator power requirement, and
wherein the controller outputs to the motor generator a command as the request to generate electricity to generate electricity by supplying from engine to the motor generator a power equal to or less than a value resulting from subtracting the hydraulic pump power requirement from the threshold value when the engine power requirement is greater than the threshold value and when the hydraulic pump power requirement is smaller than the threshold value.

4. The hybrid work machine according to claim 1,
wherein the controller calculates, at the time of sending the request to generate electricity, a hydraulic pump power requirement that is a power required by the hydraulic pump for the engine, and a motor generator power requirement that is a power required by the motor generator for the engine,
wherein the controller subsequently calculates the engine power requirement based on the sum of the hydraulic pump power requirement and the motor generator power requirement, and
wherein the controller disables the motor generator to stop generating electricity when the engine power requirement is greater than the threshold value and when the hydraulic pump power requirement is equal to or greater than the threshold value.

5. The hybrid work machine according to claim 1, further comprising:
an electric storage device for storing electricity generated by the motor generator;
wherein an amount of electricity generated by the motor generator is determined based on a state of charge of the electricity storage device, and
wherein the threshold value is set such that the threshold value increases in accordance with a decrease of the state of charge of the electricity storage device.

* * * * *